United States Patent
Hitz et al.

(10) Patent No.: US 8,256,830 B2
(45) Date of Patent: Sep. 4, 2012

(54) DASHBOARD SUPPORT

(75) Inventors: Andreas Hitz, Erwitte (DE); Kegham Arzoumanian, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 13/107,225

(22) Filed: May 13, 2011

(65) Prior Publication Data

US 2011/0278876 A1 Nov. 17, 2011

(30) Foreign Application Priority Data

May 17, 2010 (DE) .................. 10 2010 020 706

(51) Int. Cl.
*B62D 25/14* (2006.01)
(52) U.S. Cl. ...................... 296/193.02; 296/70
(58) Field of Classification Search ............ 296/187.12, 296/193.02, 70, 71, 72
See application file for complete search history.

(56) References Cited

U.S. PATENT DOCUMENTS

| | | | | |
|---|---|---|---|---|
| 6,391,470 B1* | 5/2002 | Schmieder et al. | ........... | 428/598 |
| 6,860,547 B2* | 3/2005 | Winter et al. | ............ | 296/193.02 |
| 7,458,625 B2* | 12/2008 | Kimura et al. | ................. | 296/70 |
| 7,810,874 B2* | 10/2010 | Vican et al. | .............. | 296/193.02 |
| 2004/0135400 A1* | 7/2004 | Matsuzaki et al. | ........ | 296/193.02 |
| 2004/0150251 A1* | 8/2004 | Matsutani | ............... | 296/193.02 |
| 2005/0134090 A1* | 6/2005 | Kring et al. | .............. | 296/193.02 |
| 2008/0048470 A1* | 2/2008 | Vican | ....................... | 296/193.02 |
| 2008/0054682 A1* | 3/2008 | Ellison et al. | ............ | 296/193.02 |
| 2009/0038156 A1* | 2/2009 | Hitz et al. | .................... | 29/897.2 |
| 2009/0174223 A1* | 7/2009 | Penner et al. | ............. | 296/193.02 |
| 2010/0289296 A1* | 11/2010 | Brancheriau | ............ | 296/193.02 |
| 2011/0221224 A1* | 9/2011 | Fowler | ............. | 296/70 |
| 2011/0233964 A1* | 9/2011 | Matsutani et al. | ........ | 296/193.02 |
| 2011/0254316 A1* | 10/2011 | Watanabe | ................ | 296/193.02 |
| 2011/0272961 A1* | 11/2011 | Scheib et al. | ................... | 296/72 |

FOREIGN PATENT DOCUMENTS

| | | |
|---|---|---|
| DE | 102007038940 | 3/2008 |
| DE | 102008026631 | 12/2009 |

* cited by examiner

*Primary Examiner* — Jason S Morrow
(74) *Attorney, Agent, or Firm* — Henry M. Feiereisen LLC

(57) ABSTRACT

A dashboard support of a motor vehicle includes a cross member having at least two axial profile sections of different cross-sectional configuration. The profile sections are coupled to one another by a flange plate. Secured to the cross member are support arms which are made of profile elements, with one of the support arms being a transmission tunnel support arm arranged substantially in midsection on the cross member or the flange plate. The transmission tunnel support arm is made of two sections of U-shaped cross section, with one of the two sections being shorter than the other one of the two sections.

10 Claims, 2 Drawing Sheets

DASHBOARD SUPPORT

CROSS-REFERENCES TO RELATED APPLICATIONS

This application claims the priority of German Patent Application, Serial No. 10 2010 020 706.3-21, filed May 17, 2010, pursuant to 35 U.S.C. 119(a)-(d), the content of which is incorporated herein by reference in its entirety as if fully set forth herein.

BACKGROUND OF THE INVENTION

The present invention relates to a dashboard support of a motor vehicle.

The following discussion of related art is provided to assist the reader in understanding the advantages of the invention, and is not to be construed as an admission that this related art is prior art to this invention.

Dashboard supports are used in the automobile industry in body construction to add stiffness to a dashboard or an instrument panel. Moreover, dashboard supports are also used to receive vehicle components such as a steering column for example. A dashboard support may even be used to reinforce the vehicle body. The dashboard support is arranged as part of the vehicle body between the so-called A pillars or rear regions of the front fender in an area underneath the windshield in substantial horizontal alignment. The dashboard support includes a cross member and is also provided to mount and stiffen the instrument panel which normally is made of plastic, wood and/or other materials.

Cross members for stiffening an instrument panel of a motor vehicle are typically produced with irregular profile cross-sections over the length of the cross member. Oftentimes, the cross member is made of metal or of light alloys.

Automobile manufacturers increasingly require dashboard supports to meet additional tasks. The tasks increase as functions and comfort of a motor vehicle expand, while weight and manufacturing costs should not go up. A reduction in weight or drop in production costs may, however, not be accompanied by a decrease in strength.

It would therefore be desirable and advantageous to provide an improved dashboard support which obviates prior art shortcomings and which is cost-efficiently to produce and applicable for a wide range of automobile types while yet being of little weight and exhibiting high strength values.

SUMMARY OF THE INVENTION

According to one aspect of the present invention, a dashboard support of a motor vehicle includes a cross member having at least two axial profile sections of different cross-sectional configuration, a flange plate coupling the profile sections to one another, and plural support arms secured to the cross member and made of profile elements, one of the support arms being a transmission tunnel support arm arranged substantially in midsection on the cross member or the flange plate, with the transmission tunnel support arm being made of two sections of U-shaped cross section, with one of the two sections being shorter than the other one of the two sections.

The provision of a transmission tunnel support arm of two sections of U-shaped configuration is sufficient to underpin the dashboard support on the transmission tunnel. As the area of receiving or attaching the transmission tunnel support arm on the cross member of the dashboard support needs higher strength, the presence of a second shorter U-shaped section is proposed to provide a substantially rectangular cross-sectional profile. The presence of such as rectangular cross-sectional profile is adequate to meet the required strength values in the attachment zone and may be realized by two U-shaped sections of same cross section which can be pushed within one another and coupled to establish the rectangular configuration. Coupling may be realized for example through interference fit and/or formfit and/or material joint. The provision of U-shaped profiles of same cross-sectional configuration is beneficial because of their cost-efficient production.

A provision of profile sections of different configuration allows application for a wide spectrum to satisfy the demands in terms of torsional and bending stiffness of the dashboard support. Especially in midsection of the cross member, i.e. coupling zone, coupling via a flange plate provides a particularly high strength. An example of a coupling process includes a material joint, e.g. through a thermal joining process. The presence of the flange plate also allows a matching of the dashboard support to various automobile types and/or vehicle classes by replacement of one profile section only.

According to another advantageous feature of the present invention, one of the profile sections may be arranged on a driver side and has an octagonal cross section. Such a profile section may for example be an octagonal hollow section produced from a metallic material or light metal using a forming process or other appropriate manufacturing process. An example of a forming process includes roll forming. The octagonal cross-sectional profile exhibits a high resistance against bending and torsion.

According to another advantageous feature of the present invention, the other one of the profile sections may be arranged on a passenger side and has a rectangular cross section. Compared to the driver side, the passenger side is exposed to less stress such as combination of compressive and tensile stress via the glove department or one-time brief stress as a result of a deployment of a passenger side airbag. Thus, the passenger side is exposed to less constant stress than the driver side so that the provision of a simpler profile cross section may be selected on the passenger side than on the driver side. A substantially rectangular profile cross section can be produced in a simple and cost-efficient manner and suited to the demand at hand.

According to another advantageous feature of the present invention, the profile section on the driver side may be shorter than the profile section on the passenger side. The shorter length of the profile section on the driver side permits a production of the profile section with precise dimensions to meet the demands when constructing a motor vehicle. As a result, the dashboard support, especially the cross member, can be produced in a cost-efficient manner.

There is also the possibility that the presence of a standardized first profile section of the cross member on the driver side permits an adaptive selection of the second profile section. When manufacturing a dashboard support, this means that the first profile section on the driver side may basically always be the same. Adaptively, for example when a compact car is involved, a short second profile section is used in relation to a vehicle of the upper automobile class. One and the same dashboard support is thus applicable through simple modification for use in vehicles of various automobile classes.

The transmission tunnel support arm is arranged substantially in midsection on the cross member or the flange plate. Suitably, the transmission tunnel support arm supports the dashboard support in midsection against sagging as well as torsion. The support is hereby realized in midsection or also offset with respect to the driver side.

There may also be an arrangement of the transmission tunnel support arm in the area of the flange plate. When attaching a steering column, encountered steering forces, caused by steering motions or tensile or compressive forces by the driver via the steering wheel and introduced via the steering column into the dashboard support, can now be absorbed in an optimum manner. The cross section of the first profile section can thus be minimized, thereby reducing costs while maintaining the required strength.

According to another advantageous feature of the present invention, a support arm can be configured in the form of a steering column support arm which can be made of a profile of U-shaped cross section defined by legs which have at least one area secured in a prefabricated transverse slot of the profile section arranged on the driver side. This is beneficial because the U-shaped steering column support arm can have a same cross section as the transmission tunnel support arm. By producing profiles of same cross section, production costs again decrease per running meter.

The arrangement of a steering column support arm according to the present invention has the further advantage that the U-shaped profiles can be installed first with their legs at least in some areas in the transverse slots. Changing the angle relative to the first profile section on the driver side of the cross member as well as retracting and extending in the direction of the engine compartment or also in the direction of the driver enables an adjustment to the respective steering column geometry of the vehicle at hand.

There is no need to mechanically refinish standardized components. Only positioning and securement in the form of a coupling are required in order to be able to retrofit the same dashboard support for various vehicle classes. The steering column can be fastened by providing several bores or also further applications upon the steering column support arm.

Coupling may again be realized through a gluing process or joining process. Currently preferred is a thermal joining process in the form of spot welding. The transverse slots may also be provided at an angle in relation to the longitudinal axis of the first profile section. An example for an application for that purpose involves the arrangement of steering gear and steering wheel in offset relationship with respect to the Y axis. The steering column is thus arranged again at an angle to the X axis, as viewed from the steering gear towards the steering wheel.

According to another advantageous feature of the present invention, a reinforcement member may be provided on the steering column support arm in an attachment zone with the first profile section, with the reinforcement member forming with the profile of U-shaped cross section a substantially rectangular configuration. The strength benefits in relation to the steering column support arm and dimensioning of the steering column support arm and the attachment points in the area on the first profile section correspond in analogous manner to the advantages of the transmission tunnel support in the attachment zone. The latter can be coupled in addition to the first profile section to attain higher strength values.

According to another advantageous feature of the present invention, a support arm may be configured as a splash shield support arm which can be secured to the first profile section on the driver side. The splash shield support arm may suitably be centered in midsection between the steering column support arms. This is advantageous because the splash shield support arm can again be made of the same U-shaped profile from which the other afore-described support arms can be produced. This also reduces costs.

This is also advantageous because the other support arms, like for example the transmission tunnel support arm, can be dimensioned weaker as a result of the additional attachment to the splash shield support arm because increased forces are absorbed by the splash shield support arm. Consequently, material can be saved and production is even more cost-efficient as thinner sheet metals for the individual profiles can be formed.

According to another advantageous feature of the present invention, the cross member has opposite ends, wherein each end may have a side bracket for attachment to a vehicle body. These side brackets may be made from standardized metal sheets provided for attachment to the vehicle body in the rear zone of the front fender. These attachments may also be components of an A pillar which is then welded-in during assembly of the vehicle body. Good strength values can again be realized, as a result of a coupling to the first profile section and second profile section, when the dashboard support is exposed to a possible torsional stress.

According to another advantageous feature of the present invention, a mounting may be coupled upon the cross member for receiving a vehicle component. The term "vehicle component" relates hereby to structures in the area of the glove compartment, for receiving instruments, or airbags. By using same profile types, for example a U-shaped profile of the support arms, production costs can be reduced while still retaining applicability for most different components.

According to another advantageous feature of the present invention, at least one of the two profile sections and the support arms can be manufactured through roll forming. Roll forming affords the possibility to produce the respectively desired profile section in a particularly cost-efficient and easy manner. Metal sheets in particular can be advantageously used because of their high stiffness and little weight. Metal sheets also have a long service life to withstand all kinds of stress, caused by steady vibrations or momentary peak loads.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
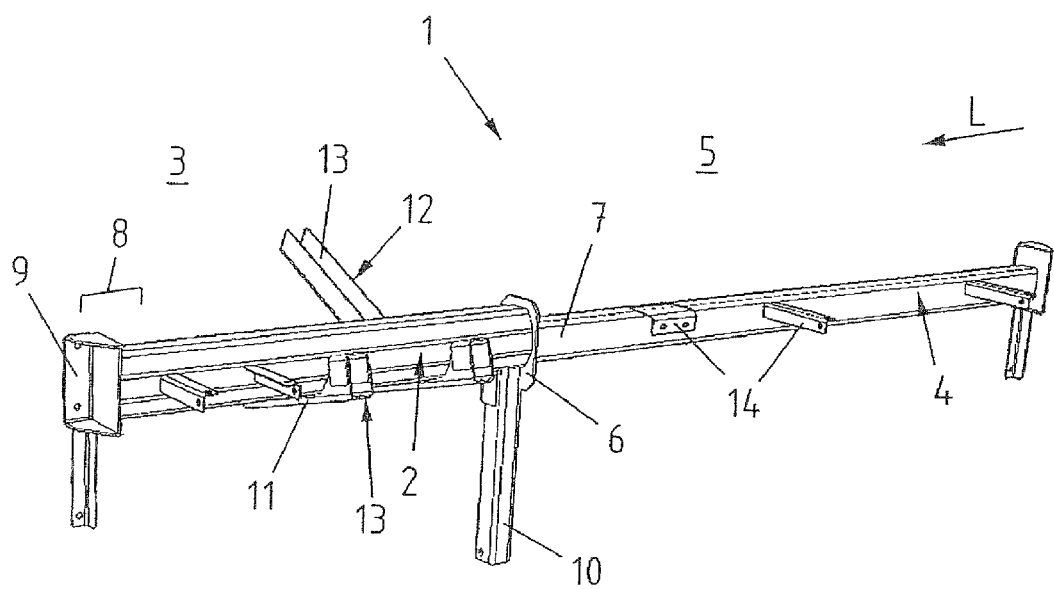
FIG. 1 is a top and side perspective view of a dashboard support according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a top and side perspective view of a dashboard support according to the present invention, generally designated by reference numeral 1. The dashboard support 1 has a first profile section 2 on a driver side 3 and a second profile section 4 on a passenger side 5. Both profile sections 2, 4 are coupled to one another at their confronting ends by a flange plate 6 and jointly form a cross member 7. The first profile section 2 has a length, as indicated in the direction of arrow L, which is shorter than a length of the second profile section 4. Secured to ends 8 of the cross member 7 are side brackets 9 for attachment of the dashboard support 1 to a not shown body of a motor vehicle. The side brackets 9 may, for example, be coupled to the first and second profile sections 2, 4 by a material joint.

The dashboard support 1 further includes a transmission tunnel support arm 10, which is secured to the first profile section 2 and the flange plate 6, and steering column support arms 11, which are intended to receive a not shown steering column. Another support in the form of a splash shield support arm 12 is secured to the first profile section 2 axially in midsection between the two steering column support arms 11. The splash shield support arm 12 is provided to couple the dashboard support 1 to a not shown splash shield. The transmission tunnel support arm 10, the steering column support arms 11, and the splash shield support arm 12 are produced, as shown in the drawings, by a same cross-sectional profile 13 of C-shaped configuration.

The dashboard support 1 further includes mountings 14 for receiving not shown vehicle components. In the area of the second profile section 4, these components may be for example a glove compartment or an airbag, and a fuse box or the like in the area of the first profile section 2.

FIG. 1 also shows that the first profile section 2 has a cross section which is greater than a cross section of the second profile section 4.

Figure 2:
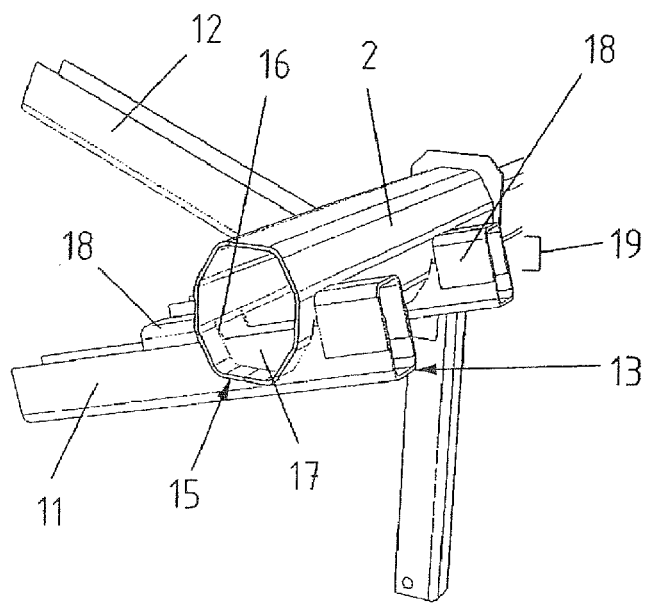
FIG. 2 is a perspective view of a detail of a first profile section of the dashboard support on a driver side.

FIG. 2 shows a perspective view of a detail of the first profile section 2 of the dashboard support 1 on the driver side 3. The first profile section 2 has a generally octagonal cross-sectional profile 15. Formed in the octagonal cross-sectional profile 15 are transverse slots 16 for receiving legs 17 of the C-shaped cross-sectional profile 13 of the steering column support arms 11. At least one area of the legs 17 of the steering column support arms 11 engages hereby the transverse slots 16. Reinforcement members 18 are arranged on the steering column support arms 11 and rest against the outer side of the first profile section 2. In the non-limiting example shown here, the reinforcement members 18 have a same C-shaped cross-sectional profile 13 as the afore-described support arms 10, 11, 12. The reinforcement members 18 are arranged in such a way as to engage in an overlap region 19 at an offset to the legs 17.

As can be seen from FIG. 2, the splash shield support arm 12 is secured to the first profile section 2 and positioned substantially in midsection centrally between the steering column support arms 11 in relation to the axial direction of the first profile section 2.

Figure 3:
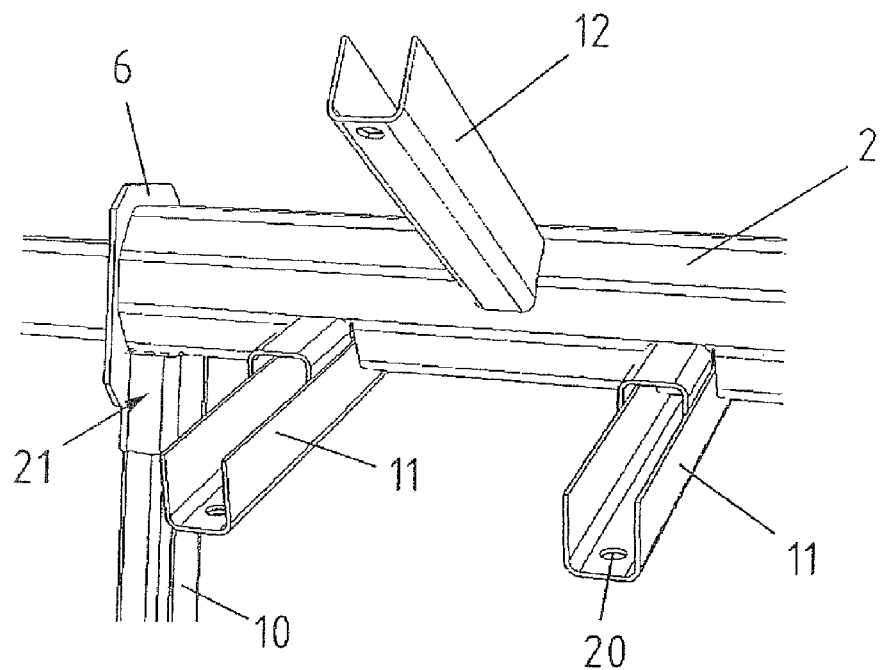
FIG. 3 is another perspective view of a detail of the first profile section of the dashboard support on the driver side.

FIG. 3 is another perspective view of a detail of the first profile section 2 as viewed from a viewpoint of the not shown splash shield. FIG. 3 also shows that the steering column support arms 11 have reinforcement members 18 on the side of the profile section 2 which is directed toward the splash shield. The steering column support arms 11 and also the splash shield support arm 12 have mounting openings 20 for receiving a steering column, not shown here, and for attachment of a splash shield, also not shown here. FIG. 3 also shows the provision of a reinforcement member 21 on the transmission tunnel support arm 10 in the attachment zone upon the first profile section 2 and the flange plate 6. The reinforcement member 21 of the transmission tunnel support ram 10 has also the C-shaped cross-sectional profile 13 as is used for the reinforcement members 18 and support arms 10, 11, 12. The transmission tunnel support ram 10 is further coupled to the first profile section 2 and to the flange plate 6.

Figure 4:
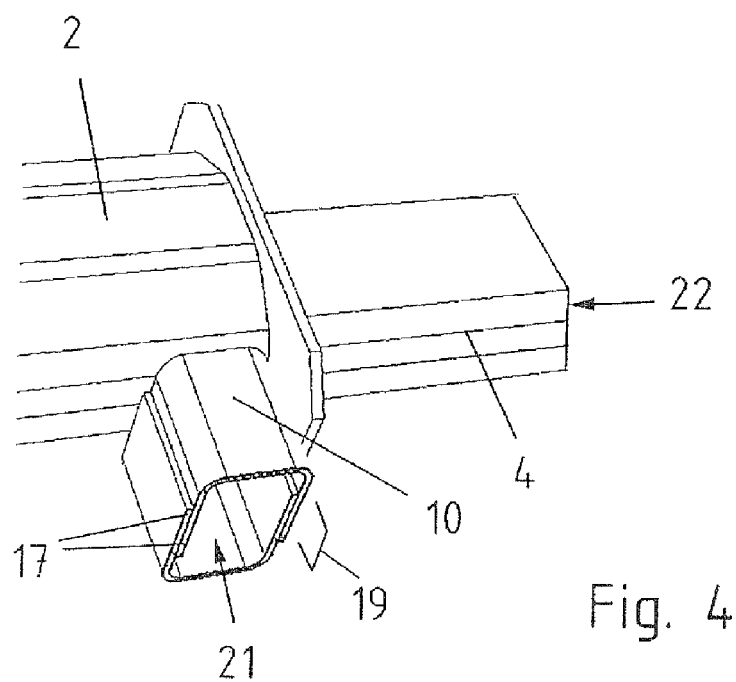
FIG. 4 is a perspective side view of a detail of a flange plate of the dashboard support.

FIG. 4 shows a perspective side view of the transmission tunnel support arm 10, as viewed from the not shown transmission tunnel. The transmission tunnel support arm 10 has been cut to the same length as the reinforcement member 21. FIG. 4 also shows an overlap region 19 in which the legs 17 of the reinforcement member 21 and of the transmission tunnel support arm 10 are positioned above one another. FIG. 4 also shows the generally rectangular configuration 22 of the second profile section 4.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A dashboard support of a motor vehicle, comprising:

a cross member having at least two axial profile sections of different cross-sectional configuration;

a flange plate coupling the profile sections to one another; and plural support arms secured to the cross member and made of profile elements, one of the support arms being a transmission tunnel support arm arranged substantially in midsection on the cross member or the flange plate, said transmission tunnel support arm being made of two sections of U-shaped cross section, with one of the two sections being shorter than the other one of the two sections, wherein another one of the support arms is a steering column support arm which is made of a section having U-shaped configuration defined by legs which have at least one area secured in a prefabricated transverse slot of one of the profile sections arranged on a driver side.

2. The dashboard support of claim 1, wherein one of the profile sections is arranged on a driver side and has an octagonal cross section.

3. The dashboard support of claim 1, wherein one of the profile sections is arranged on a passenger side and has a rectangular cross section.

4. The dashboard support of claim 1, wherein one of the profile sections is arranged on a driver side and the other one of the profile sections is arranged on a passenger side, wherein the one profile section on the driver side is shorter than the other profile section on the passenger side.

5. The dashboard support of claim 1, further comprising a reinforcement member provided on the steering column support arm in an attachment zone with the one profile section, said reinforcement member forming with the section of U-shaped configuration a substantially rectangular configuration.

6. The dashboard support of claim 1, wherein another one of the support arms is a splash shield support arm secured on one of the profile sections arranged on a driver side.

7. The dashboard support of claim 6, wherein two other support arms are steering column support arms, said splash shield support arm being centered in midsection between the steering column support arms.

8. The dashboard support of claim 1, wherein the cross member has opposite ends, each end having a side bracket for attachment to a vehicle body.

9. The dashboard support of claim 1, further comprising a mounting coupled with the cross member for receiving a vehicle component.

10. The dashboard support of claim 1, wherein at least one of the two profile sections and the support arms are manufactured through roll forming.

* * * * *

UNITED STATES PATENT AND TRADEMARK OFFICE
CERTIFICATE OF CORRECTION

PATENT NO. : 8,256,830 B2  
APPLICATION NO. : 13/107225  
DATED : September 4, 2012  
INVENTOR(S) : Andreas Hitz et al.

Page 1 of 1

It is certified that error appears in the above-identified patent and that said Letters Patent is hereby corrected as shown below:

Column 6, Fig. 3, lines 1 and 3: Change "ram 10" to --arm 10--.

Signed and Sealed this  
Twenty-seventh Day of November, 2012

David J. Kappos  
*Director of the United States Patent and Trademark Office*

UNITED STATES PATENT AND TRADEMARK OFFICE
CERTIFICATE OF CORRECTION

PATENT NO. : 8,256,830 B2  Page 1 of 1
APPLICATION NO. : 13/107225
DATED : September 4, 2012
INVENTOR(S) : Andreas Hitz et al.

It is certified that error appears in the above-identified patent and that said Letters Patent is hereby corrected as shown below:

Column 6, lines 1 and 3: Change "ram 10" to --arm 10--.

This certificate supersedes the Certificate of Correction issued November 27, 2012.

Signed and Sealed this
First Day of January, 2013

David J. Kappos
*Director of the United States Patent and Trademark Office*